United States Patent
König (10) Patent No.: US 6,550,719 B2
(45) Date of Patent: Apr. 22, 2003

(54) AIRCRAFT AND DRIVE DEVICE FOR AIRCRAFT

(76) Inventor: Helmut König, Stiegengasse 1, Graz (AT), A-8010

(*) Notice: Subject to any disclaimer, the term of this patent is extended or adjusted under 35 U.S.C. 154(b) by 0 days.

(21) Appl. No.: 09/934,173

(22) Filed: Aug. 20, 2001

(65) Prior Publication Data

US 2003/0034420 A1 Feb. 20, 2003

(30) Foreign Application Priority Data

Aug. 18, 2000 (DE) .......................... 100 40 577

(51) Int. Cl.[7] .......................... B64D 27/00; B64C 11/02
(52) U.S. Cl. .......................... 244/55; 244/16
(58) Field of Search .......................... 244/16, 54, 55, 244/58, 65

(56) References Cited

U.S. PATENT DOCUMENTS

| | | | | |
|---|---|---|---|---|
| 2,007,878 A | * | 7/1935 | Schulman | 244/55 |
| 2,604,276 A | * | 7/1952 | Huben | 244/55 X |
| 3,084,889 A | * | 4/1963 | Irbitis | 244/55 |
| 4,998,995 A | * | 3/1991 | Blythe | 244/55 |
| 5,743,489 A | * | 4/1998 | Stemme | 244/65 X |

FOREIGN PATENT DOCUMENTS

DE 3240995 A1 * 5/1984 .................. 244/16

* cited by examiner

Primary Examiner—Robert P. Swiatek
(74) Attorney, Agent, or Firm—Townsend and Townsend and Crew LLP (57) ABSTRACT

In order to provide a compact, high-performance drive device for aircraft, in particular for power gliders, which comprise a propeller which is driven by a motor, preferably by an electric motor, and the blades (6) of which can be tilted towards the propeller shaft (15) by way of a joint and in the tilted-out position pass through a running gap (5) for the propeller formed between the nose, in which the generally minimal conditions of space are utilized in an optimum manner and which ensures the necessary aerodynamic properties of the aircraft, the invention proposes that the motor (10) should be arranged in front of the propeller in the space bounded by the nose (4). In this way, the interior of the aircraft as far as the running gap (5) for the propeller is made available for the pilot or the aircraft passengers, so as to ensure optimum use of the said interior and the length of the aircraft can be kept short.

27 Claims, 7 Drawing Sheets

AIRCRAFT AND DRIVE DEVICE FOR AIRCRAFT

BACKGROUND OF THE INVENTION

The invention relates to an aircraft and a drive device for aircraft, in particular for power gliders, having a propeller which is driven by a motor, preferably by an electric motor, and the blades of which can be tilted towards the propeller shaft by way of a joint and in the tilted-out position pass through a running gap for the propeller formed between the nose of the aircraft and the fuselage by displacement of the said nose.

In the case of gliders it is already known to provide a propeller drive for the starting procedure. In this case the propeller blades can be tilted towards the propeller shaft by way of a joint, so that during the flight without the motor they are covered by the nose resting against the fuselage and do not offer any resistance to the oncoming air, and, as a result, the gliding properties of the aircraft are improved. In the case of self-starting and/or in a motor-cruising flight, a running gap for the propeller is freed between the nose and the fuselage by displacement of the said nose, the propeller blades tilted out by centrifugal force passing through the said running gap for the propeller.

In the case of known aircraft of this type, a drive motor is provided behind the pilot's seats, the drive motor driving the propeller—the blades of which pass through the running gap for the propeller—by way of an extension-shaft arrangement (DE 28 14 586 C2). Because of the space required for the motor, a design of this type increases the length of the aircraft in an undesired manner and, as a result of the shaft arrangement extending between the pilot's seats, creates unfavorable conditions of space.

SUMMARY OF THE INVENTION

It is an object of the present invention to provide a compact, high-performance drive device for aircraft, in particular for power gliders, in which the generally minimal conditions of space are utilized in an optimum manner, and which also ensures the necessary aerodynamic properties of the aircraft. In order to attain this object, the invention proposes that the motor should be arranged in front of the propeller in the space bounded by the nose. The design according to the invention allows the interior of the aircraft to be utilized in an optimum manner as far as the running gap for the propeller while retaining the aerodynamically refined shape of a slim glider fuselage, the spice of neutral center-of-gravity behind the pilot can be utilized for receiving [current-] supply batteries and an undercarriage, optionally a retractable undercarriage, and its design is not spoiled by a power source situated at this point and which would result in an extension of the fuselage or an increase in the cross-section of the fuselage. In addition, the invention allows a direct drive of the propeller by the motor, since the propeller is situated immediately adjacent to the motor. Furthermore, the large propeller diameter possible in the design according to the invention ensures an optimum driving speed of the aircraft.

In accordance with a preferred embodiment of the invention the motor is arranged on a support projecting from the fuselage, in particular from a rib passing through the said fuselage, in the direction towards the nose.

The said support is preferably formed by a tube in which actuating devices for displacing the nose and energy-supply devices and/or further actuating devices for example for the adjustment or locking of the propeller blades and/or control and measuring devices are arranged. In this particularly expedient embodiment the tube not only is used for supporting or securing the motor but also receives the aforesaid devices. In the simplest case the tube is traversed by a preferably tubular rod which is arranged so to be displaceable in the longitudinal direction of the tube and which is connected to the nose, so that as a result of displacement of the rod in the longitudinal direction of the tube the nose fastened to the said rod can be moved into the desired position. The tubular design of the rod makes it possible for the aforesaid energy-supply devices and/or control and measuring devices, such as for example cables for the supply of the drive motor in the form of an electric motor for the propeller, dynamic-airspeed indicators or the like, to be passed through the rod.

In accordance with a further embodiment of the invention the front end of the nose has an opening which—when the running gap for the propeller is closed—is covered by a closure member secured to the support. If the opening is closed by the closure member, optimum aerodynamic conditions occur during the flight without the motor. If, on the other hand, the aircraft is driven by way of the propeller and the nose is therefore displaced to free the running gap for the propeller, air passes by way of the opening into the space which is enclosed by the nose and which receives the motor, as a result of which the motor is cooled.

If the motor is designed in the form of an electric motor, according to the invention the arrangement is made that the motor has a stator secured to the support and a rotor which is mounted so as to be rotatable about the said stator and which is connected to the propeller. A design of this type makes it possible to connect the stator rigidly to the support and to drive the propeller directly from the rotor without the interposition of a shaft. In this case it is advantageous if the end region of the rotor facing the fuselage is provided with attachments from which joint pins project in the direction towards the fuselage on which the propeller blades are pivotably mounted. A design of this type also makes it possible to insert the point pins into the corresponding bearing shells of the propeller blades from the front.

The propeller blades are preferably held by springs in their position tilted towards the propeller shaft, thereby ensuring that when the propeller is not being driven the nose can be displaced beyond the propeller blades in the direction towards the fuselage.

It is advantageous if a brake, which can preferably be activated by the actuating device for the displacement of the nose, is provided for the rotor of the motor. This brake prevents the propeller blades from continuing to move even if the motor is switched off, and thus from retaining their tilted-out position in an undesired manner.

In accordance with a preferred embodiment a brake of this type is provided with arms, preferably spring-loaded, which are mounted on the support so as to be displaceable and at the free ends of which a brake lining cooperating with the rotor of the motor is arranged. If the actuating device is used at the same time for changing the position of the nose, when the latter is displaced in the direction towards the fuselage the brake lining first comes to rest against the rotor and brakes it, after which the blades are tilted against the propeller shaft and the running gap for the propeller is then closed.

If the end of the nose bounding the running gap for the propeller is not circular, but is made oval for example, then, in order to be able to push the nose over the tilted propeller blades, it is necessary as a rule for these propeller blades and also therefore the rotor directly connected to the propeller blades to occupy a defined rest position. In order to provide for this rest position, the brake lining is subdivided into segments in the peripheral direction of the rotor, at least one segment being constructed in the form of a spring-loaded component engaging in a depression in the rotor. When this component engages in the depression in the rotor, the latter is fixed in a precisely defined position.

Depending upon whether the aircraft is to be started with the propeller, whether the motion of the aircraft is to be assisted by the propeller drive during the flight or whether the batteries required for driving the electric motor are to be charged during the flight without the motor by way of the electric motor now acting as a charging generator, it is necessary to alter the angle of incidence of the propeller blades and to lock the propeller blades in the respective setting. For this purpose, according to the invention, the propeller blades can be provided with a rotatably mounted setting member, preferably a bearing pin extending at a right angle to the propeller shaft, the setting member being displaceable and rotatable by way of a setting device. In this case, according to the invention, an arm, which is displaceable in the longitudinal direction of the support and which is provided with a coupling part causing the setting member—preferably the bearing pin—to be rotated, can be mounted so as to be rotatable on the support. As a result of the displacement of the said arm jointly rotating with the propeller, the angle of incidence of the propeller blades is altered in the desired manner by way of the coupling part.

The arm is advantageously mounted so as to be rotatable on a sleeve, preferably spring-loaded, which is arranged on the support so as to be displaceable in the longitudinal direction of the support and which is connected to an entrainment means passing through a recess in the support and cooperating with the actuating devices, so that an adjustment of the propeller blades can also be carried out by the actuating devices provided in the tubular support.

As already mentioned, after the adjustment of the angle of incidence of the propeller blades it is necessary to lock the latter in the set position. For this purpose, the setting member, preferably the bearing pin, of the propeller blade can be provided with a locking device which fixes the rotational position set. To this end, a slide block is provided, which rotates with the propeller blade and which cooperates with a locking member jointly rotating during the rotation of the setting member, preferably the bearing pin, and causing the propeller blade or its mounting to be fixed. If the setting member or the bearing pin is turned in order to set the angle of incidence of the propeller blade, the locking member slides along the slide block, the shape of which is selected in such a way that at specified angles of incidence the propeller blade is locked.

For this purpose, the locking member can be mounted so as to be displaceable in a guide at a right angle to the axis of the bearing pin and can be provided with projections such as stubs, studs, pins or the like which engage in recesses in the propeller blade or its mounting. As a result of the displacement of the locking member produced by way of the slide block when the setting member, preferably the bearing pin, is turned, fixing is carried out by the projections engaging in the recesses when the angle of incidence of the propeller blades is set.

The locking member is advantageously pressed by a resilient element, preferably by a spring, so as to rest against the slide block, as a result of which undesired relative movements between the locking member and the slide block are prevented.

In the case of power gliders with their own starting capability the necessary starting run is determined essentially by the moment of inertia of the aircraft and the efficiency of the propeller drive. If an electric motor is used as a drive motor for the propeller, on account of the generally constricted conditions of space it is advisable to set its structural size only to a minimum requirement for climbing and distance flight, so that the power required for the existing starting run is frequently not available for the starting phase. In this case it is advantageous if an additional electric motor which drives the undercarriage wheels in the starting phase is provided. This electric motor, which can be connected to the battery supplying the electric motor for driving the propeller blades, assists the traction force of the propeller in the starting phase by the ground contact of the said undercarriage wheels and the coefficient of function which is present.

In order to simplify the operation and control of a propeller driven by way of an electric motor and the additional electric motor driving the undercarriage wheels, it is advantageous to provide a shift gate for a joystick in the cockpit, the shift gate comprising two shift paths joined to each other, the build-up of torque at the wheels being controlled by the movement of the joystick in one of the paths and the other path comprising a plurality of intermediate positions for the joystick, in which [intermediate positions] the build-up of torque at the propeller and optionally at the undercarriage wheels is controlled during the starting procedure as well as for fixing the setting of the propeller blades.

DESCRIPTION OF THE PREFERRED EMBODIMENTS

Figure 1:
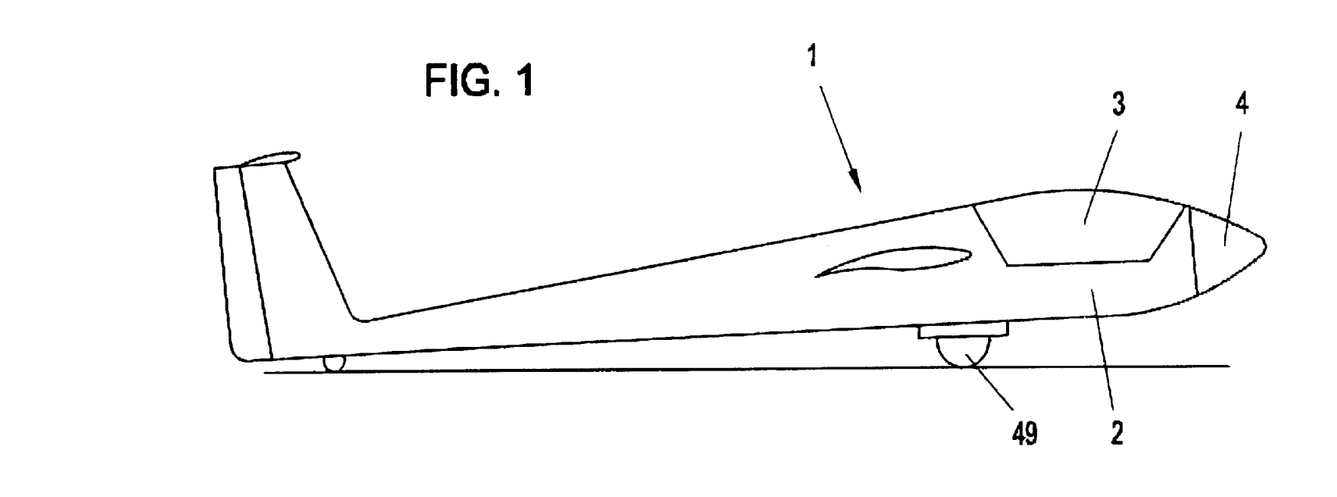
FIG. 1 is a side view of a power glider with the running gap for the propeller closed and thus with the propeller not driven.
Figure 2:
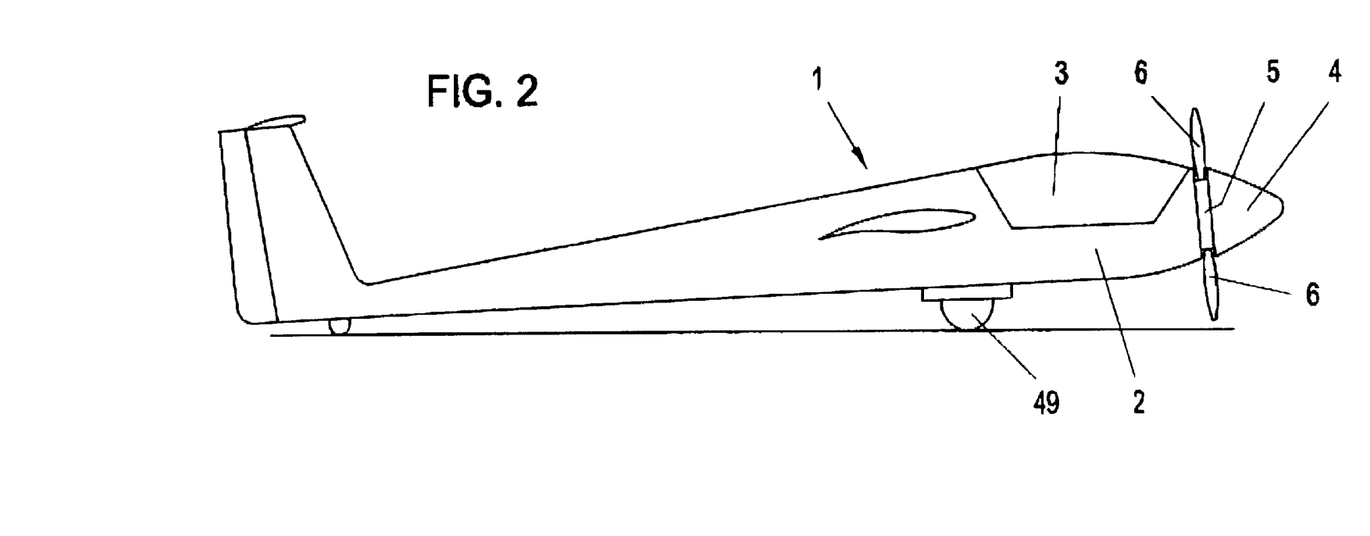
FIG. 2 shows the power glider with the running gap for the propeller opened and with the propeller blades passing through this running gap for the propeller.

The power glider 1 illustrated in FIGS. 1 and 2 comprises a fuselage 2 with a cockpit 3 and a nose 4 as well as undercarriage wheels 49. In the setting shown in FIG. 2 the nose 4 is pushed forward, so that a running gap 5 for the propeller is formed through which the propeller blades 6 can pass.

Figure 3:
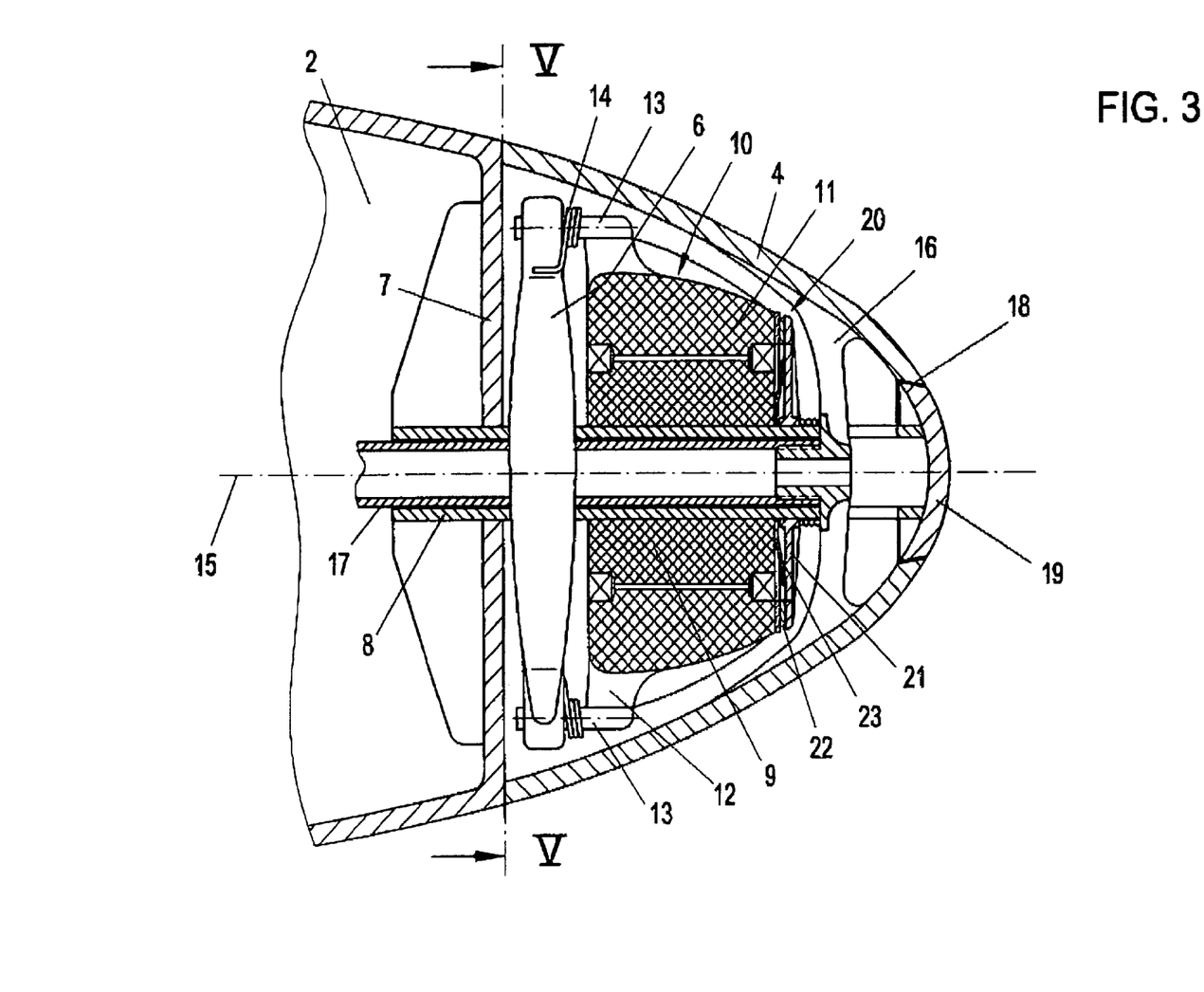
FIG. 3 is a longitudinal section through the front part of the power glider with the running gap for the propeller closed.
Figure 4:
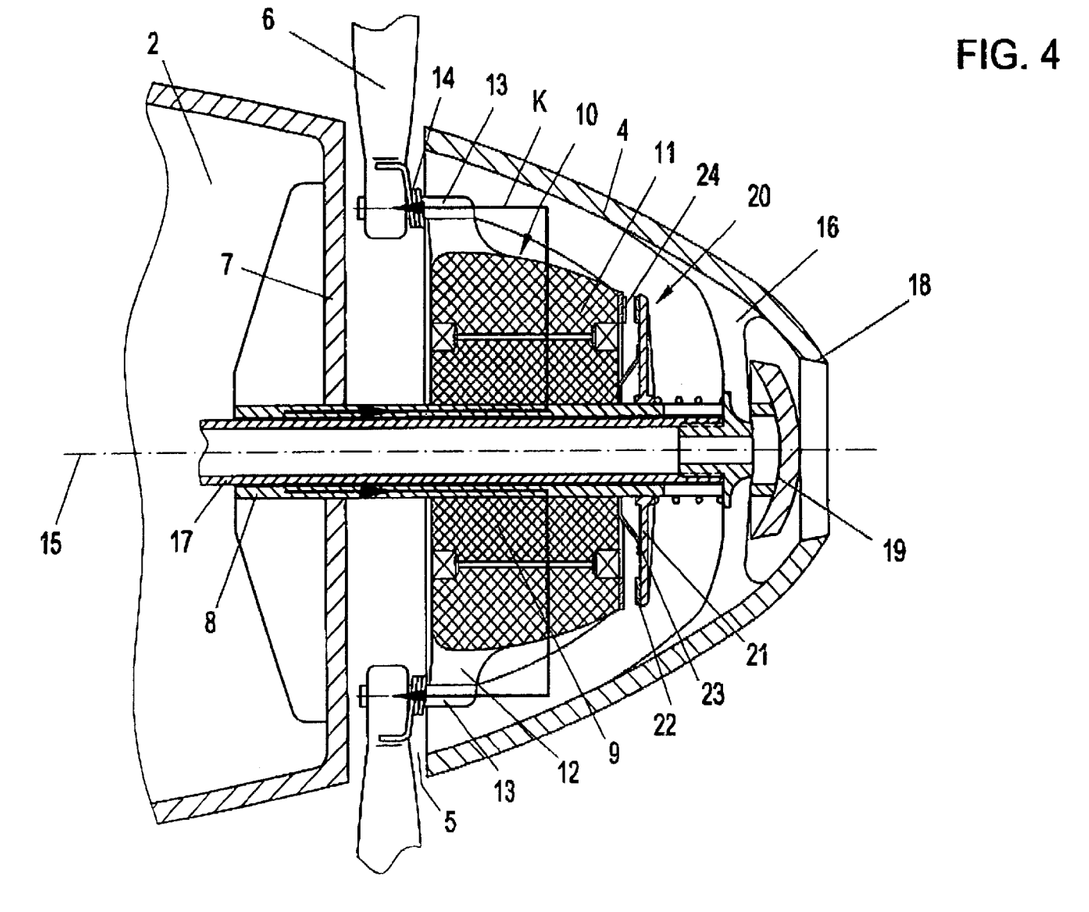
FIG. 4 is similar to FIG. 3 and shows the running gap for the propeller opened.
Figure 5:
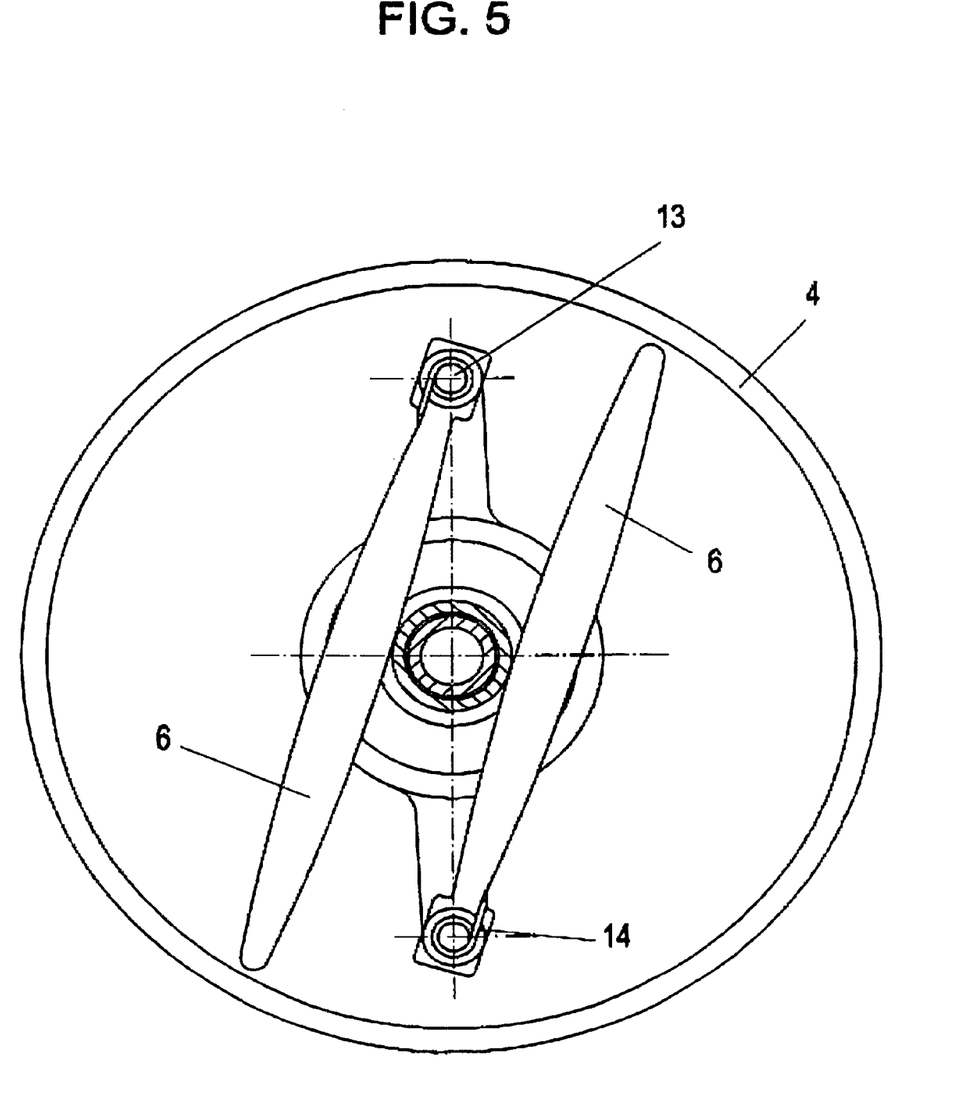
FIG. 5 is a section taken along the line V—V in FIG. 4.

As may be seen in FIGS. 3 to 5, the fuselage 2 is bounded at the front by a rib 7 which traverses the said fuselage and to which a tube 8 projecting forwards in the direction towards the nose 4 is fastened. The stator 9 of an electric motor 10 is supported on the said tube 8 in a rotationally fixed manner. An outer-ring rotor 11 surrounds the said stator 9, and is provided at its end region facing the fuselage 2 with attachments 12 on which the propeller blades 6 are fastened by way of joint pins 13 so as to be pivotable.

FIG. 4 shows the course of the forces which are clarified by the arrows K. The rib 7 transmits its retaining force to the support 8 and by way of the latter to the stator 9, so as to result in a power flow extending forwards. A power flow directed towards the rear to the propeller blades 6 takes place from the rotor 11 by way of the attachments 12 and the joint pins 13. A reversal of power flow occurs as a result of the special arrangement of the motor 10 in front of the propeller blades 6.

If the propeller blades 6 are not driven by the electric motor 10, they are held in their position tilted against the propeller shaft 15 by springs 14 surrounding the joint pins 13, as illustrated in FIG. 3. In this case the running gap 5 for the propeller is closed and the nose 4 rests against the fuselage 2.

If the aircraft is driven by way of the propeller, the nose 4 must first be pushed forwards in order to free the running gap 5 for the propeller, as illustrated in FIG. 4. For this purpose the nose 4 is connected by way of brackets 16 to a tubular actuating device 17 which passes through the tube 8 and which is arranged so as to be displaceable in the direction of the propeller shaft 15. If the propeller is driven by way of the electric motor 10 in the position of the nose 4 illustrated in FIG. 4, the propeller blades 6 are pivoted outwards as a result of the centrifugal force which occurs and thus become effective for driving purposes. The displacement of the actuating device 17 can take place either manually or by an auxiliary motor.

The electrical energy required is supplied to the electric motor 10 from easily accessible batteries—arranged behind the seats in the fuselage—by way of power cables guided in the tubular actuating device 17. The said tubular actuating device 17 can also receive additional control and measuring devices and/or lines leading to such control and measuring devices.

At its front end the nose 4 has an opening 18 which when the running gap 5 for the propeller is closed by a closure member 19 fastened to the tube 8, as illustrated in FIG. 3. If the nose 4 is pushed into the position illustrated in FIG. 4 and the running gap 5 for the propeller is thus freed so that the propeller blades can be driven by the electric motor 10, the closure member 19 is removed from the opening 18, so that air can enter through the opening 18 and can emerge again by way of the running gap 5 for the propeller. In this case the air passes over the electric motor 10 and results in a cooling thereof.

In order to prevent the propeller blades 6 from continuing to be driven by the air resistance when the electric motor 10 is switched off, a brake 20 which can be activated by the tubular actuating device 17 is provided. In this case arms 21, at the free ends of which brake linings 22 cooperating with the rotor 11 are arranged and which are stressed by springs 23, are mounted on the tube 8 so as to be displaceable in the longitudinal direction of the tube. The brake linings 22 are subdivided into segments on their continuous face, one segment being constructed in the form of a spring-loaded component which engages in a depression 24 in the rotor 11 per revolution of the rotor. If the rod-shaped actuating device 17 is displaced in one direction in such a way that the nose 4 approaches the fuselage 2, the rotor 11 is first braked by the brake linings 22 and after the spring-loaded segment engages in the depression 24 the rotor 11 is blocked in a defined position, which is particularly important when the end region of the nose 4 facing the fuselage 2 has a shape deviating from a circular shape, i.e. for example is made elliptical. The propeller blades 6 can then be tilted by the springs 14 into the position illustrated in FIG. 3 against the propeller shaft 15.

Figure 6:
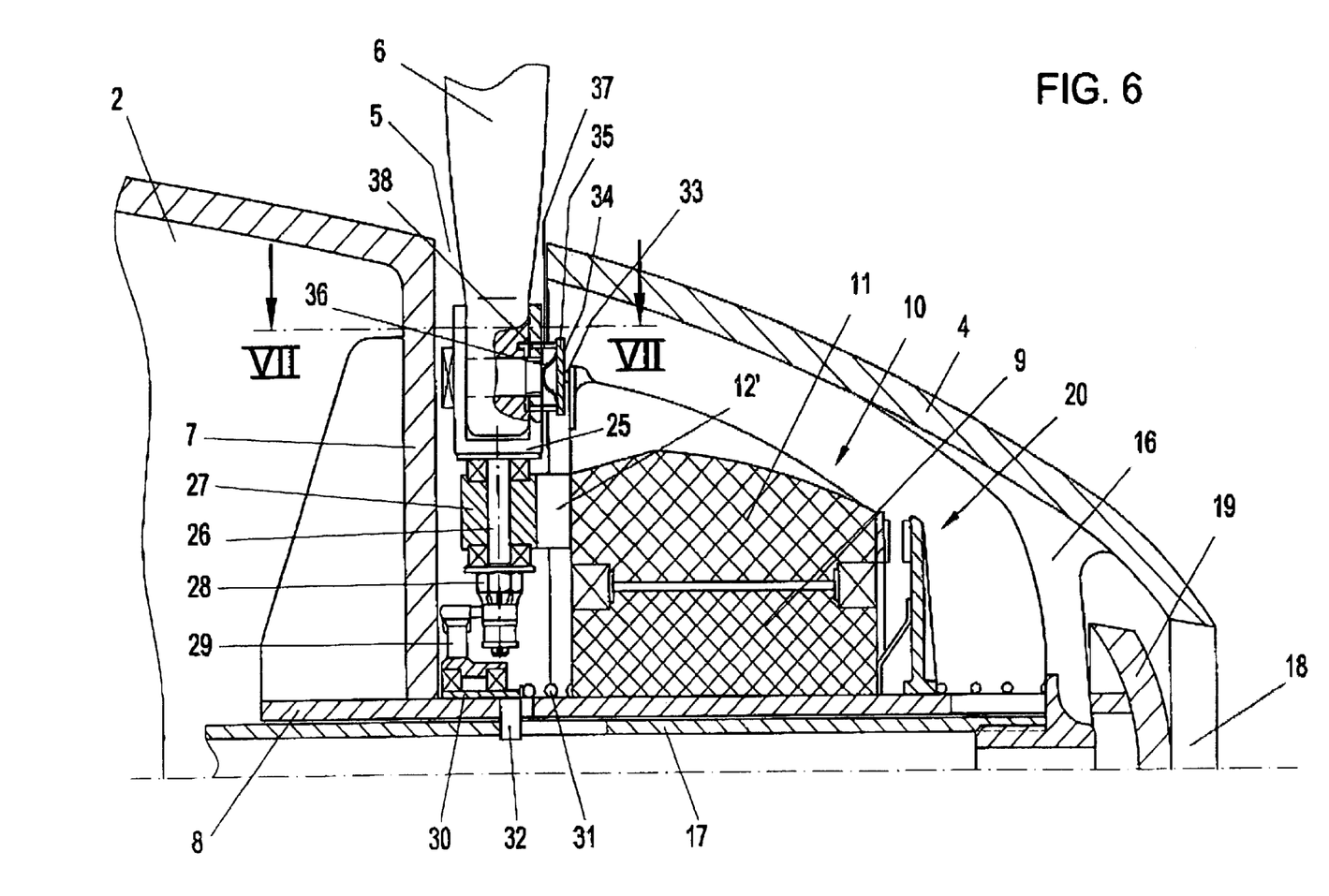
FIG. 6 shows a modified embodiment of the invention, namely a longitudinal section through the front part of a power glider with the running gap for the propeller opened.

An embodiment is illustrated in FIG. 6 in which the angle of incidence of the propeller blades can be altered. Such an alteration of the angle of incidence of the propeller blades is necessary for example when the propeller blades—moved by the air flow during a flight without the motor—drive the electric motor 11 which now acts as a generator, so that the batteries can be charged during the flight. For this purpose the propeller blades are mounted so as to be pivotable in a fork 25 provided with a bearing pin 26 which extends at a right angle to the propeller shaft 15 and which is mounted so as to be pivotable in a bearing 27 on an annular attachment 12' connected to the rotor 11. At its end projecting out of the bearing 27 the bearing pin 26 is provided with a coupling part 28 which cooperates with an arm 29 which is mounted so as to be rotatable on a sleeve 30 arranged displaceably on a support 8 in the longitudinal direction of the support. The sleeve 30 is pressed by a spring 31 in the direction towards the rib 7 and can be pressed by displacement of the actuating device 17 in the longitudinal direction of the support against the force of the spring 31. For this purpose the sleeve 30 is connected to an entrainment means 32 passing through the support 8 and cooperating with the actuating device 17.

During the rotation of the propeller the arm 29 mounted rotatably on the sleeve 30 rotates jointly with the propeller. If the actuating device 17 is displaced in the longitudinal direction of the support, the arm 29 is also displaced by way of the entrainment means 32, as a result of which the propeller blade 6 is pivoted around the bearing pin 26 by way of the coupling part 28 and so the angle of incidence of the propeller blade 6 is altered.

Figure 7A:
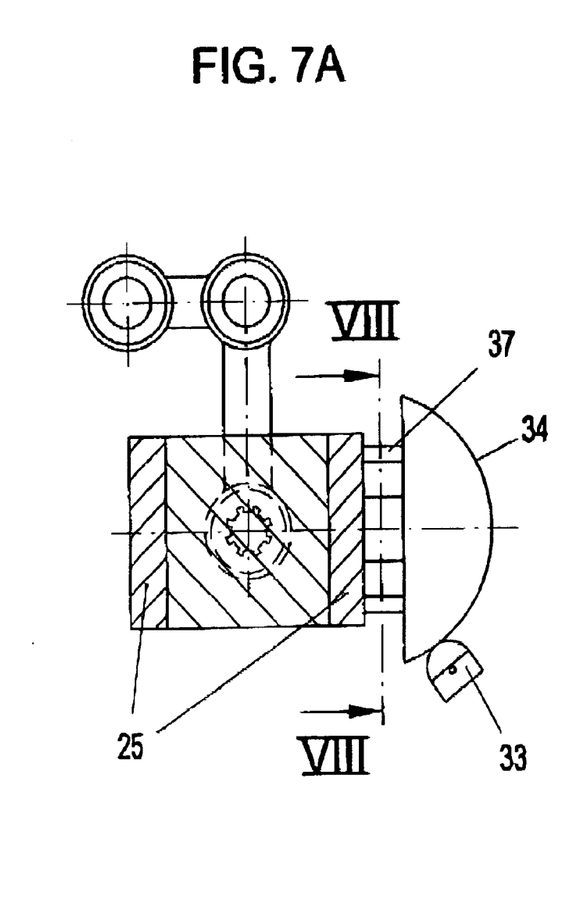
FIGS. 7A and 7B are sections on a larger scale taken along the line VII—VII in different settings of the angle of incidence of the propeller blades.
Figure 7B:
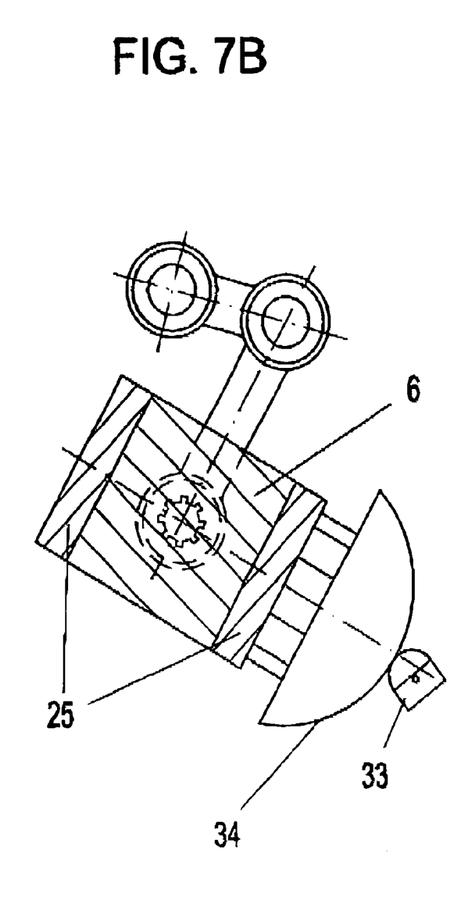
Figure 8:
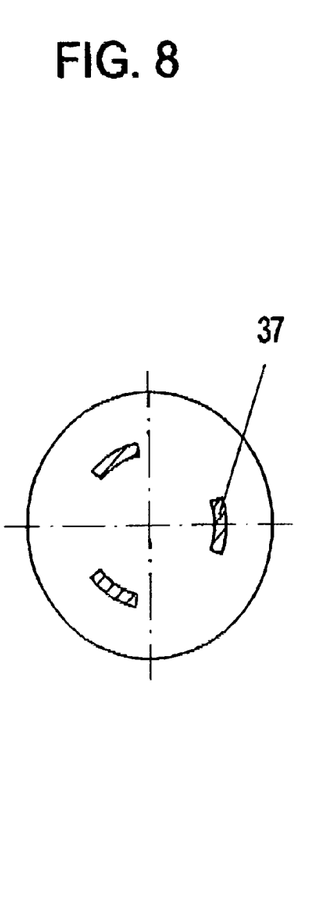
FIG. 8 is a section taken along the line VIII—VIII in FIG. 7A.

In order to lock the propeller blade 6 in its set position, a slide block 33 is provided which rotates with the propeller blade and which cooperates with the peripheral face 34 of a locking member 35 mounted so as to be displaceable in a guide at a right angle to the axis of the bearing pin 26 and stressed by a spring 36 in such a way that its peripheral face 34 is pressed so as to rest against the slide block 33.

The locking member 35 is provided with stubs 37 which engage in recesses 38 in the fork 25 and thus cause the propeller blade 6 to be locked in the set position.

Figure 9:
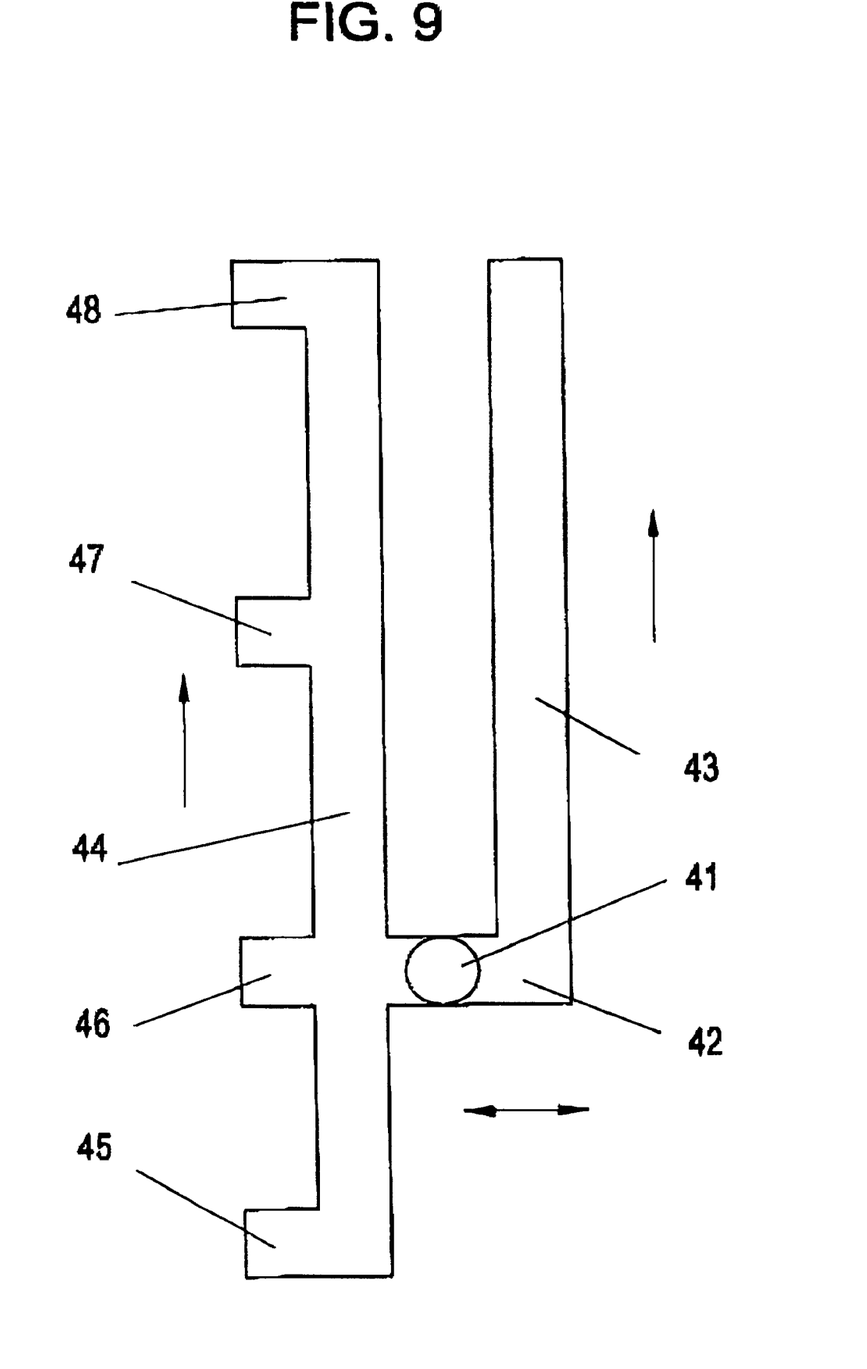
FIG. 9 schematically shows the shift gate.

FIG. 9 shows a shift gate for a joystick 41, which [shift gate] comprises two parallel shift paths 43, 44 joined together by way of a transversely extending path 42. When the joystick 41 is moved in the shift path 43 a build-up of torque occurs at the undercarriage wheels 49 for manoeuvring the aircraft on the ground traffic surface.

The shift path 44 has four intermediate settings 45, 46, 47, 48. Starting from the rest position the build-up of torque is initiated in setting 46 at the propeller and optionally at the undercarriage wheels 49 during the starting procedure. In setting 47 the maximum torque is achieved, and in setting 48 the undercarriage wheels 49 are driven in order to assist the starting phase by an additional electric motor.

What is claimed is:

1. An aircraft and a drive device for aircraft comprising a propeller which is driven by a motor, the propeller including blades which can be tilted towards a propeller shaft by way of a joint and in a tilted position pass through a running gap for the propeller formed between a nose of the aircraft and a fuselage by displacement of the nose, the motor being arranged in front of the propeller in a space bounded by the nose.

2. An aircraft and a drive device according to claim 1 wherein the motor is arranged on a support projecting from the fuselage in a direction towards the nose.

3. An aircraft and a drive device according to claim 2 wherein the support is formed by a tube in which an actuating device for displacing the nose and energy-supply devices are arranged.

4. An aircraft and a drive device according to claim 3 including a tubular rod traversing the tube and arranged so as to be displaceable in the longitudinal direction of the tube, the tubular rod being connected to the nose.

5. An aircraft and a drive device according to claim 2 wherein a front end of the nose has an opening which—when the running gap for the propeller is closed—is covered by a closure member secured to the support.

6. An aircraft and a drive device according to claim 2 wherein the motor has a stator secured to the support and a rotor which is mounted so as to be rotatable about the stator and which is connected to the propeller in a rotationally fixed manner.

7. An aircraft and a drive device according to claim 2 wherein an end region of the rotor facing the fuselage is provided with radially projecting attachments from which joint pins project in the direction towards the fuselage and on which the propeller blades are pivotably mounted.

8. An aircraft and a drive device according to claim 2 wherein the support is formed by a tube in which an actuating device for adjusting and locking the propeller blades is arranged.

9. An aircraft and a drive device according to claim 2 wherein the support is formed by a tube in which actuating devices for control and measuring devices are arranged.

10. An aircraft and a drive device according to claim 2 wherein the support comprises a rib passing through the fuselage.

11. An aircraft and a drive device according to claim 1 including springs holding the propeller blades in their position tilted towards the propeller shaft.

12. An aircraft and a drive device for aircraft according to claim 1 wherein the motor is an electric motor, and including an additional electric motor which drives undercarriage wheels in a starting phase.

13. An aircraft and a drive device according to claim 1, including a shift gate for a joystick, the shift gate comprising two shift paths joined to each other, wherein a build-up of torque at the undercarriage wheels is controlled by movement of the joystick in one of the paths and the other path comprises a plurality of intermediate positions for the joystick at which the build-up of torque at at least one of the propeller and the undercarriage wheels is controlled during the starting phase as well as for fixing the setting of the propeller blades.

14. An aircraft and a drive device according to claim 1 wherein the motor comprises an electric motor.

15. An aircraft and a drive device for aircraft comprising a propeller which is driven by a motor having a rotor and includes blades which can be tilted towards the propeller shaft by way of a joint and in their tilted-out position pass through a running gap for the propeller formed between a nose and a fuselage of the aircraft by displacement of the nose, and a brake for the rotor and the motor which can be activated by an actuating device for displacing the nose.

16. An aircraft and a drive device according to claim 15 wherein the brake includes arms which are mounted on a support so as to be displaceable, and a brake lining cooperating with the rotor of the motor arranged at free ends of the arms.

17. An aircraft and a drive device according to claim 16 wherein the brake lining is subdivided into segments in a peripheral direction of the rotor, and wherein at least one segment is constructed in the form of a spring-loaded component engaging a depression in the rotor.

18. An aircraft and a drive device according to claim 16 wherein the arms are spring loaded.

19. An aircraft and a drive device according to claim 15 wherein the brake for the rotor and the motor can be activated by an actuating device for displacing the nose.

20. An aircraft and a drive device for aircraft comprising a propeller which is driven by a motor, the propeller including blades which can be tilted towards a propeller shaft by way of a joint and in a tilted position pass through a running gap for the propeller formed between a nose and a fuselage of the aircraft by displacement of the nose, the propeller blades being provided with a rotatably mounted setting member that is displaceable and rotatable by way of a setting device.

21. An aircraft and a drive device according to claim 20 including a support mounting the motor to the fuselage, and an arm displaceable in a longitudinal direction of the support and provided with a coupling part causing rotation of the setting member to be rotated, the arm being rotatably mounted on the support.

22. An aircraft and a drive device according to claim 20 including a support mounting the motor to the fuselage, and wherein an arm is rotatably mounted on a sleeve arranged on the support so as to be displaceable in a longitudinal direction of the support, and including entrainment means passing through a recess in the support, cooperating with an actuating device for displacing the nose, and connected to the arm.

23. An aircraft and a drive device according to claim 20 wherein the setting member for the propeller blade is provided with a locking device which fixes the set rotational position thereof.

24. An aircraft and a drive device according to claim 23 including a slide block which rotates with the propeller blades and which cooperates with a locking member jointly rotating during the rotation of the setting member and causing one of the propeller blades and a mounting for the propeller blades to be fixed.

25. An aircraft and a drive device according to claim 24 wherein the setting member includes a bearing pin, a guide mounting the locking member to be displaceable at a right angle to an axis of the bearing pin, and wherein the locking member is provided with projections that engage in recesses of one of the propeller blades and a mounting for the propeller blades.

26. An aircraft and a drive device according to claim 24 including a resilient element pressing the locking member against a slide block.

27. An aircraft and a drive device according to claim 20 wherein the setting member comprises a bearing pin extending at a right angle to the propeller shaft.

* * * * *